United States Patent Office 3,158,659
Patented Nov. 24, 1964

3,158,659
NOVEL DERIVATIVE OF THEOPHYLLINE
Albert Schlesinger, Jackson Heights, N.Y., assignor to Endo Laboratories, Inc., Richmond Hill, N.Y., a corporation of New York
No Drawing. Filed July 11, 1961, Ser. No. 123,109
4 Claims. (Cl. 260—253)

This invention relates to a novel derivative of theophylline. More particularly, it is directed to 7-(2'-di-isopropyl aminoethyl)-theophylline, having the formula:

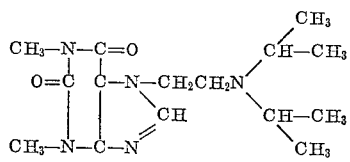

Therapeutic application of a variety of xanthine derivatives, as exemplified by caffeine and theophylline, is well known. Compounds of this class have valuable activities in regard to central stimulation, when such action is desired. However, the most frequent use of theophylline is as a bronchodilator. The use of bronchodilators in patients suffering from respiratory, bronchial and pulmonary disorders is very valuable. However, the value of this material is limited by the central stimulation or excitation which it produces, since persons suffering from the aforementioned disorders cannot tolerate central excitation or stimulation.

In the course of my investigations to discover a derivative of theophylline possessing such bronchodilator activity but devoid of central stimulation activity, I prepared a large number of derivatives of theophylline substituted at the 7-position, among which were the dialkyl aminoethyl derivatives of theophylline, said group being attached to the 7-position of theophylline.

Illustrative of this group were 2'-dimethylaminoethyl, 2'-di-N-propylaminoethyl, 2'-di-isopropylaminoethyl, and 2'-di-N-butylaminoethyl derivatives of theophylline.

All of these show bronchodilator activity in lesser or greater degree. However, all of these except the 2'-di-isopropylaminoethyl theophylline also show central stimulation and excitation.

The comparison of bronchodilating activity of the compounds was made on the guinea pig tracheal chain by the method of Castillo and De Beer (Journal of Pharmacology and Experimental Therapeutics, vol. 90, page 104, 1957). In this method a bronchodilator compound causes a relaxation or dilation of the trachea, and the amount of dilation is recorded quantitatively by the falling of a lever writing on a smoked paper.

As shown in the following table, 7-(2'-di-isopropylaminoethyl) theophylline is a potent branchodilator, being 2 times as active as aminophylline and about 3 to 20 times as active as the related 7-(2'-dialkylaminoethyl) theophyllines.

Furthermore, 7-(2'-di-isopropylaminoethyl) theophylline differs from the other dialkylaminoethyl theophyllines and from theophylline in its action on the central nervous system and its general pattern of side reactions or toxicity.

As shown in the table, the other dialkylaminoethyltheophyllines are excitatory, when injected subcutaneously into mice, rapidly causing excitement, tremors, and violent convulsions. In contrast, 7-(2'-di-isopropylaminoethyl) theophylline is slightly sedative, causing slow and gradual depression.

| Compound | Bronchodilator Activity (Aminophylline=1) | Central Nervous System Effect (Dose in mg./kg., subcutaneously, mice) | |
|---|---|---|---|
| 7-(2'-dimethylaminoethyl)-theophylline. | 0.3 | 125-250 | Excitement, violent convulsions, death in 20 min. |
| 7-(2'-diethylaminoethyl)-theophylline. | 0.7 | 250-500 | Excitement, tremors, violent convulsions, death in 15 min. |
| 7-(2'-dipropylaminoethyl)-theophylline. | 0.5 | 250-500 | Excitement, tremors, violent convulsions, death in 25 min. |
| 7-(2'-di-isopropylaminoethyl)-theophylline. | 2.0 | 250-500 | Sedation, depression, death only after several hours. |
| 7-(2'-dibutylaminoethyl)-theophylline. | 0.1 | 125-250 | Excitement, violent tremors, convulsions, death in 20 min. |

The foregoing shows that it was surprising and unexpected to find that 7-(2'-di-isopropylaminoethyl)-theophylline, in contrast to the other compounds, possesses a depressant action.

The new compound thus produces neither excitation nor the convulsive action resulting from central stimulation of other xanthine derivatives. When combined with compounds known to produce central stimulation, e.g., ephedrine, the central stimulation of such compounds is either diminished or abolished.

This compound thus possesses the valuable bronchodilator activity of xanthine derivatives and in fact is more active than theophylline-ethylene-diamine (known as aminophylline), without the undesirable central stimulatory activity of such compounds, and in fact possessing activity which counteracts central stmiulation.

The new compound of my invention may be prepared by several different routes. It may be prepared by the interaction of the sodium derivative of theophylline, with di-isopropylaminoethyl chloride.

A second method is by the interaction of 7-(2'-aminoethyl)-theophylline, with an isopropyl halide.

A third method is by the interaction of 7-(2'-chloroethyl)-theophylline with di-isopropylamine.

Thus the routes merely exemplify a variety of methods by which the compound of my invention may be produced.

Accordingly, it as among the principal objects of this invention to provide the valuable bronchodilator activity of xanthene derivative without the undesirable central stimulatory activity of such compounds; and other advantages as above set forth, including means for preparing the same.

The compound of my invention is an organic base. The free base is difficultly soluble in water. However, it is possible to convert this compound into a water-soluble salt by reaction of the base with pharmaceutically acceptable, non-toxic, inorganic and organic acids, e.g., hydrochloric acid, sulfuric acid, phosphoric acid, acetic acid, malic acid, maleic acid, fumaric acid, citric acid, tartaric acid, phthalic acid, isophthalic acid, terephthalic acid, etc. These salts are soluble in water, and many of them are soluble in alcohols of lower molecular weight.

The following examples will exemplify the practice of my invention, without thereby limiting alternate methods for achieving the same compound.

Example 1

7-(2'-di-isopropyl-aminoethyl)-theophylline: A mixture of 12.1 grams of 7-(2'-chloro-ethyl) theophylline and 30 grams of di-isopropyl amine in 150 cc. of anhydrous toluene is refluxed for 90 hours. To the cooled solution is added 50 cc. of 40% NaOH. The toluene layer is separated and dried over anhydrous calcium sulfate. 200 cc. of pentane is added to the filtered solution. On cooling in an ice-bath, the new base crystallizes. M.P. 119° C.

Example 2

An alcoholic solution of the base (product of Example 1) is added to an alcoholic-HCl solution. The hydrochloride salt crystallizes, and after recrystallization from alcohol-ether melts at 163° C. Calcd. for $$C_{15}H_{25}N_5O_2 \cdot HCl$$

Cl—10.32%. Found: Cl—10.38%.

Example 3

The maleic acid salt is formed by dissolving the base and maleic acid in equivalent amounts in hot isopropanol. On cooling, the salt precipitates in crystalline form. M.P. 131° C.

It will be understood that the foregoing description of the invention and the examples set forth are merely illustrative of the principles thereof. Accordingly, the appended claims are to be construed as defining the invention within the spirit and scope thereof.

I claim:

1. A member of the group consisting of 7-(2'-di-isopropylaminoethyl)-theophylline and the pharmaceutically acceptable acid addition salts thereof.
2. 7-(2'-diisopropylaminoethyl)-theophylline.
3. The hydrochloride of the compound of claim 2.
4. The maleic acid addition salts of the compound of claim 2.

References Cited in the file of this patent

FOREIGN PATENTS

| | | |
|---|---|---|
| 214,626 | Australia | July 11, 1957 |
| 588,571 | Canada | Dec. 8, 1959 |

OTHER REFERENCES

Wertheim: Textbook of Organic Chemistry, 2nd ed., page 37 (1945).

Fieser et al.: Organic Chemistry, 3rd ed., pages 30 and 31 (1956).